(12) United States Patent
Liebig et al.

(10) Patent No.: US 7,150,595 B2
(45) Date of Patent: Dec. 19, 2006

(54) UNDERCUT ANCHOR ELEMENT THAT CAN BE MOUNTED WITH POSITIVE ENGAGEMENT

(75) Inventors: Heinrich Liebig, Pfungstadt (DE); Ingrid Liebig-Hundius, Legal Representative, Pfungstadt (DE); Heinz Joachim Liebig, Legal Representative, Pfungstadt (DE)

(73) Assignee: Heinrich Liebig Stahldubelwerke GmbH, Pfungstadt (DE)

( * ) Notice: Subject to any disclaimer, the term of this patent is extended or adjusted under 35 U.S.C. 154(b) by 0 days.

(21) Appl. No.: 10/333,527

(22) PCT Filed: Jul. 31, 2000

(86) PCT No.: PCT/EP00/07367

§ 371 (c)(1),
(2), (4) Date: May 21, 2003

(87) PCT Pub. No.: WO02/08615

PCT Pub. Date: Jan. 31, 2002

(65) Prior Publication Data
US 2004/0253075 A1    Dec. 16, 2004

(30) Foreign Application Priority Data
Jul. 21, 2000   (DE)   ................... 100 35 580

(51) Int. Cl.
*F16B 13/06*   (2006.01)
(52) U.S. Cl. ........................ 411/60.3; 411/72
(58) Field of Classification Search .................. 411/29, 411/30, 31, 57.1, 60.2, 60.3, 72, 60.1
See application file for complete search history.

(56) References Cited

U.S. PATENT DOCUMENTS

| | | | | |
|---|---|---|---|---|
| 2,033,100 A | * | 3/1936 | Kellogg | 52/242 |
| 5,263,803 A | * | 11/1993 | Anquetin | 411/31 |
| 5,342,157 A | * | 8/1994 | Fischer | 411/72 X |
| 5,746,557 A | * | 5/1998 | Kaibach | 411/54.1 |
| 5,807,049 A | * | 9/1998 | Beck et al. | 411/31 |
| 5,816,760 A | * | 10/1998 | Mattner et al. | 411/31 X |
| 5,993,128 A | * | 11/1999 | Mark et al. | 411/30 |
| 6,012,887 A | * | 1/2000 | Kaibach et al. | 411/30 |
| 6,027,292 A | * | 2/2000 | Raber | 411/71 |
| 6,074,145 A | * | 6/2000 | Kaibach et al. | 411/54.1 |

FOREIGN PATENT DOCUMENTS

| | | | |
|---|---|---|---|
| DE | 4333471 | * | 6/1994 |
| DE | 19 520130 | * | 12/1996 |

* cited by examiner

*Primary Examiner*—Flemming Saether
(74) *Attorney, Agent, or Firm*—Norris McLaughlin & Marcus

(57) ABSTRACT

An undercut anchor element comprising a shank of an anchor bolt. The shank passes through a base part, which is provided for effecting an anchoring, passes through a spacer sleeve, and at the end thereof is provided with a tightening head. The tightening head can be pulled inside the base part, which is subdivided into anchoring segments by slots provided over a portion of the length of the base part. The slots lead from the front free end of the base part up and into the area of an encircling groove. The anchoring segments have the outer shape of two truncated cones which coincide with their ends that have a smaller diameter. The truncated cone that is located in front in a direction of mounting has an obtuse cone angle of greater than 150° and the adjoining truncated cone has an acute cone angle of less than 30°.

5 Claims, 2 Drawing Sheets

UNDERCUT ANCHOR ELEMENT THAT CAN BE MOUNTED WITH POSITIVE ENGAGEMENT

BACKGROUND OF THE INVENTION

The invention relates to an undercut anchor element with an anchor bolt, the elongate cylindrical shank of which is provided on its end which is to the rear in the fitting direction with a fixing head or a nut screwed onto a thread and has on its end which is to the front in the fitting direction a tightening head which widens in the shape of a truncated cone with a radially projecting annular projection provided on its free end, on which there is displaceably mounted a tubular base component which has multiple slots extending from its end which is at the front in the fitting direction and over a part of its length and forms a number of anchoring segments in the slotted region, the said base component having an internal diameter substantially equal to or somewhat greater than the external diameter of the cylindrical shank and having in its outer face a circumferential groove spaced from the end which is at the front in the fitting direction, wherein the said groove causes the end regions of the anchoring segments which are at the front in the fitting direction to be pivotable outwards whilst the material remaining in the base of the groove is deformed in such a way that in the state in which they are inserted into an appertaining fixing bore they are pivoted up by the introduction of a tensional force which displaces the anchor bolt and the base component relative to one another, whereby the anchoring segments taken together have the external shape of two truncated cone surfaces which abut one another with their end faces of smaller diameter and of which the base surfaces formed, on the one hand, on the end which is at the front in the fitting direction and, on the other hand, on the groove when they are not pivoted up each have a diameter which substantially corresponds to or is somewhat smaller than the external diameter of the base component, the truncated cone surface which is at the front in the fitting direction forming a cutting edge.

Such undercut anchor elements, which during fitting in a fixing bore in a substrate are anchored with positive engagement in the bore by penetration of a cutting edge in the wall of the fixing bore, have provoked increasing interest in recent years because they ensure a secure anchoring in the bore and thus fixing of components on a substrate without high radial forces acting on the wall of the bore, as is the case with the so-called spreading dowels which are anchored by frictional engagement in the bore. Because of the high radial spreading forces which are necessary for the anchoring by frictional engagement, the use of such spreading dowels is only possible in substrates made from concrete material or also solid stone or rock material which can be subjected to a correspondingly high load, and even with concrete substrates which can be loaded sufficiently it is only possible to provide fixing bores with considerable clearance from the boundary of the respective concrete component in order to ensure that the fixing bore does not break open when the spreading dowel is mounted. On the other hand, anchor elements to be fitted with positive engagement in bores are anchored on undercut surfaces which are larger than the diameter of the actual fixing bore and are produced either separately before the fitting of the anchor element by means of a special undercut drilling tool or—in the case of the undercut anchor elements under discussion here—are produced from the anchor element itself during fitting by penetration of chisel-like anchoring portions of an anchoring component of the anchor element itself penetrating radially into the wall of the bore. In this case radial forces are produced only in the zone of penetration of the chisel-like anchoring portions into the wall of the bore, i.e. are confined to a small region of the bore and are also relatively low in this region because the chisel-like construction of the anchoring portions allows them to penetrate into the wall of the bore even in the case of relatively low radial forces. In a known undercut anchor element of the aforementioned type (DE 105 20 130 A1) the base component identified there as an anchor sleeve has a relatively great longitudinal extent and the longitudinal slots forming the anchoring segments are guided a little further still beyond the groove and into the closed part of the anchor sleeve so that in the upper region extending beyond the circumferential groove they form individual arm portions which can be bent up under certain conditions, namely when during fitting the tightening head is drawn in by a predetermined additional amount into the anchoring segments. In this case the arm portions which are then expanded resiliently come to rest against the wall of the fixing bore and in turn exert radial spreading forces over a wide area there, but these are precisely the forces which should be avoided in the case of the undercut anchor elements under discussion here.

SUMMARY OF THE INVENTION

The object of the invention is to make further developments to the known undercut anchor element in such a way that it is ensured in every case that the anchor element is fitted with positive engagement in the appertaining fixing, i.e. the exertion of a radial spreading force on the wall of the bore in larger regions is reliably avoided.

Starting from an undercut anchor element of the type referred to in the introduction, this object is achieved according to the invention in that that the slots which form the anchoring segments in the base component extend from the end of the base component which is at the front in the fitting direction as far as and into the region of the circumferential groove, that the tightening head is so dimensioned in its axial extent and conicity that the upper boundary surface of the annular projection facing the base component butts against the free ends of the anchoring segments in the positively engaged state of the anchor element and prevents spreading of the portions of the anchoring segments which form the first truncated cone beyond abutment against the wall of an appertaining fixing bore, and that the portions of the anchoring segments which adjoin the closed sleeve portion of the base component and taken together form a first truncated cone are longer than the portions of the anchoring segments which adjoin them and are at the front in the fitting direction and together form the second truncated cone, whereby the cone angle formed by generatrices of the outer boundary surface of the first truncated cone lying diametrically opposite in each case encloses an acute angle of less than 30°, preferably less than 20°, and the cone angle formed by generatrices of the outer boundary surface of the second truncated cone lying diametrically opposite encloses an obtuse angle of more than 150°, preferably more than 160°, and the generatrices of the boundary surfaces of the first and second truncated cone intersect at an angle in the range between 85° and 95°, preferably substantially at right angles. In this way it is ensured that the locking segments can only be pivoted out by such an amount that, with the exception of the forces exerted by the cutting edges, they cannot exert any spreading force on the wall of the bore.

In this case the slots which form the anchoring segments in the base component advantageously extend from the end of the base component which is at the front in the fitting direction only as far as the groove side wall delimiting the circumferential groove. Thus this sleeve portion of the base component is closed all round and cannot expand radially even under the effect of high axial forces, so that it is ensured that the base component also cannot expand radially in its portion lying above the anchoring segments.

BRIEF DESCRIPTION OF THE DRAWINGS

The invention is explained in greater detail in the following description of an embodiment in connection with the drawings, in which.

DETAILED DESCRIPTION OF THE INVENTION

Figure 1:
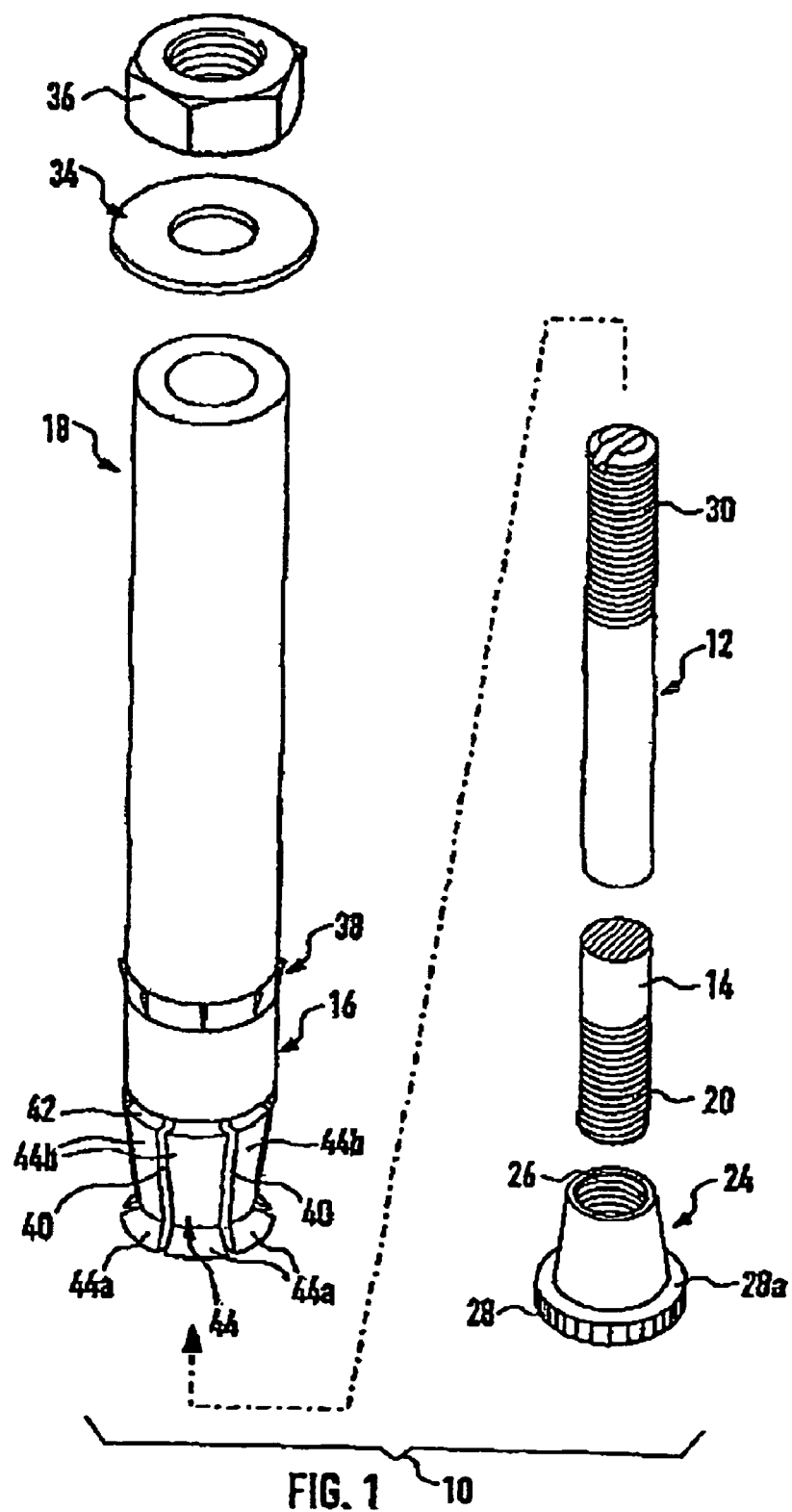
FIG. 1 shows a perspective exploded representation of an undercut anchor element according to the invention.

The undercut anchor element which is illustrated in the drawings and is denoted in its entirety by 10 is composed of the components which are explained in detail below, namely an elongate anchor bolt 12, a tubular base component 16 disposed so as to be longitudinally displaceable on the cylindrical shank 14 of the anchor bolt, a spacer sleeve 18, a tightening head 24 which in the illustrated embodiment is screwed on a thread 20 of the anchor bolt 12 at the lower end in the drawing and is provided with a threaded bore 26 which widens conically from the shank 14 of the anchor bolt. On the end of the tightening head 24 which is innermost in the bore a circumferential annular projection 28 is provided which projects radially and is provided with a knurling on its circumferential surface and of which the upper radial boundary surface 28a facing the base component forms a stop surface, the function of which will be explained below. On its end region opposite the tightening head 24, the shank 14 is provided with a thread 30 over which a washer 34 can be pushed until it rests on the upper end of the spacer sleeve 18 and then a nut 36 can be screwed on. In a special case an axially compressible plastic ring 38 is disposed between the base component 16 and the spacer sleeve 18, the said ring being made from plastic and provided with radially projecting and tapered teeth offset relative to one another in the circumferential direction, and the said ring serves as first rotation-locking means during fitting of the undercut anchor element 10 inserted into a fixing bore and because of its compressibility it makes a retightening route available which allows the nut 36 of the fitted anchor element 10 to be retightenable and so a component 32 mounted by means of the anchor element can be screwed onto the substrate in play-free abutment in any case.

Figure 2:
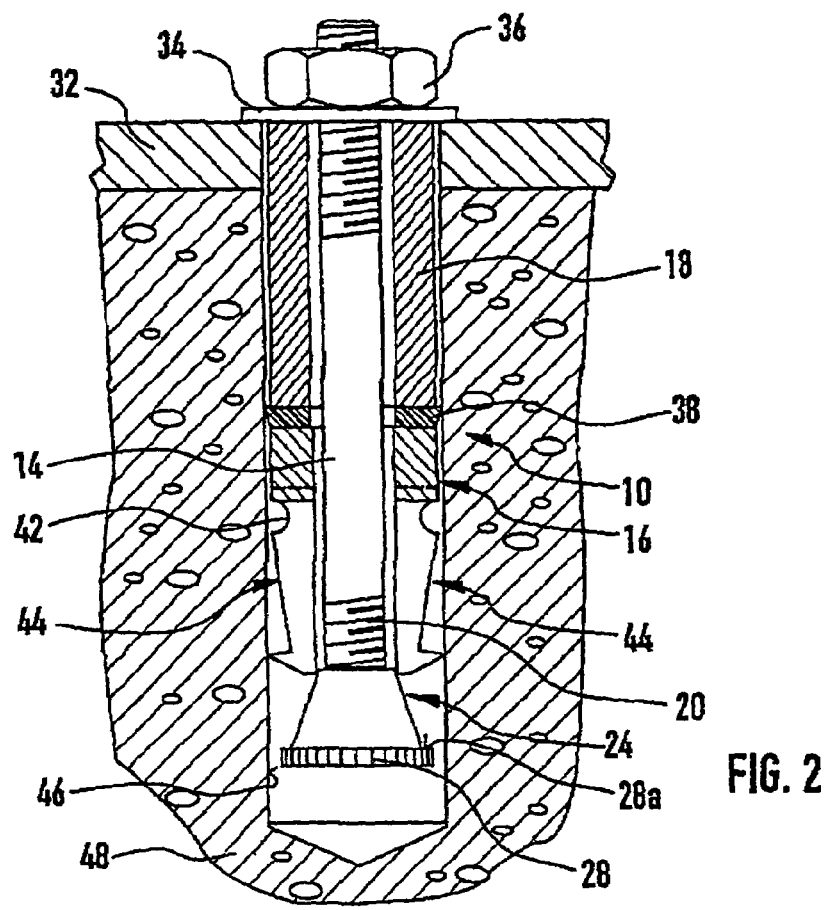
FIG. 2 shows a sectional view through the anchor element constructed in accordance with the invention according to FIG. 1 in the starting position for fixing a component inserted in a fixing bore in a substrate before the fixing of the anchor element with positive engagement.

On the end of the tubular component 16 which is at the front in the fitting direction a total of six anchoring segments 44 are formed—in the illustrated case—by longitudinal slots 40 cut in from the end face which is innermost in the bore and offset at uniform angular spacing over a part of the length of the base component, a circumferential groove 42 being cut into the outer face of the said anchoring segments and spaced from the end which is at the front in the fitting direction, and this groove causes the anchoring segments 44 to be pivotable outwards whilst the material remaining in the base of the groove is deformed. In the illustrated case these longitudinal slots 40 extend as far as the upper boundary wall of the circumferential groove 42. In this way it is possible for the anchoring segments, which have been pushed until the front inner edges of the anchoring segments 44 butt against the circumferential surface of the tightening head 24, to spread by drawing in of the tightening head 24 into the base component and with further axial drawing in of the tightening head by turning of the nut 36 it is possible for the end regions of the anchoring segments to pivot up according to the conicity of the tightening head to such an extent that cutting edges formed on the outer face of their free ends cut into the material of the wall of a fixing bore 46 (FIGS. 2 and 3) in a substrate 48 into which the anchor element 16 is inserted, and these cutting edges then form an undercut in the fixing bore in this region. In FIG. 2 the undercut anchor element 10 according to the invention is shown inserted into such a fixing bore 46 but not yet in a fitted state, whereby the radially outer regions of the washer 34 disposed below the nut 36 are supported on the upper face of a component 32 to be fixed on a substrate 48, e.g. a concrete slab.

Figure 3:
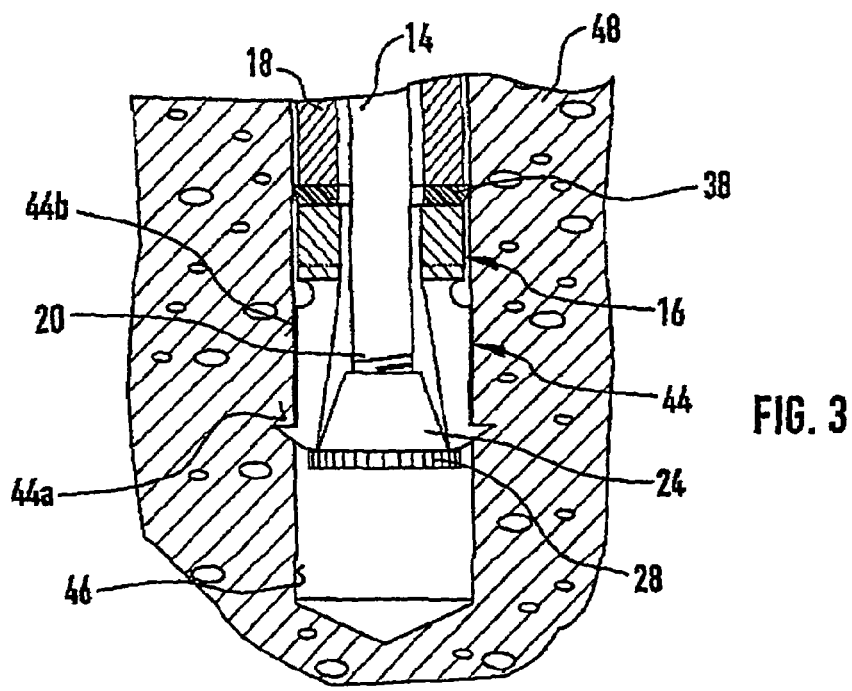
FIG. 3 shows the end portion of the anchor element of FIG. 2 which is innermost in the bore in the fitting position obtained by tightening the nut provided on the outer end of the anchor bolt.

FIG. 3 shows the fitted state in the bore 46 which is effected by the drawing in of the tightening head 24 into the base component 16. Since the ends of the anchoring segments which are innermost in the bore are pivoted up to a an external diameter measurement which is greater than the diameter of the fixing bore 46, the base component 16 and thus the anchor element 10 as a whole can only be withdrawn from the bore 46 by destroying the bore. Forces acting in the direction of withdrawal, for example the forces acting in the shank 14 of the anchor bolt 12 from the nut 36 during clamping of the component 32 onto the substrate 48, attempt to draw the tightening head 24 further into the base component, as a result of which the end regions of the anchoring segments which are innermost in the bore are additionally pivoted in the sense of a radial expansion and the locking of the anchoring segments with positive engagement in the wall of the bore would be, so to speak, reinforced depending upon the tightening force introduced via the anchor bolt 12 or upon a load exerted by the fixed component 32 on the anchor bolt in the withdrawal direction. However, due to the radially projecting annular projection the tightening head 24 can only be drawn so far into the anchoring segments 44 until the boundary surface 28a of the annular projection comes to rest on the end surfaces of the anchoring segments 44, i.e. pivoting out of the anchoring segments beyond the amount—shown in FIG. 3—is not possible.

The anchoring segments 44 formed by the circumferential groove 42 in the base component have, when taken together, the shape of a double truncated cone which is discernible in FIGS. 1, 2 and 3, in which two truncated cone surfaces 44a, 44b which butt against one another with their end faces of smaller diameter form a circumferential necking in the outer surface of the anchoring segments. In this case the base surface of the truncated cone surface 44a which is at the front in the fitting direction and the base surface of the truncated cone surface 44b formed on the groove 42 each have a diameter which corresponds substantially to or is somewhat smaller than the external diameter of the base component 16. In particular the cutting edge formed on the circumference of the base surface of the truncated cone surface 44*a* should in this case have a somewhat smaller diameter than the base component 16. In this case the design is such that the truncated cone surfaces 44*a* formed on the end region of the anchoring segments 44 which is at the front in the fitting direction enclose an obtuse cone angle of more than 150°, preferably more than 160°, whilst the truncated cone surfaces or boundary surfaces 44*b* of the adjoining portion of the anchoring segments 44 have a cone angle of less than 30°, preferably less than 20°.

Due to the obtuse cone angle of the boundary surface 44*a* and the acute cone angle of the conical or boundary surface 44*b*, these boundary surfaces meet at an angle of approximately 90°, and the outer edges of the truncated cone surface 44*a* form sharp-edged chisel-like cutting edges which during fitting of the anchor element are pivoted out from the retracted position in the fixing bore 46 as shown in FIG. 2 into the position shown in FIG. 3, in which they have penetrated the material of the wall of the bore and are anchored there with positive engagement. Forces directed radially outwards into the wall of the fixing bore only occur during the fitting operation in the immediate penetration zone of the cutting edges into the wall of the bore and, moreover, due to the sharp-edged construction of the chisel-like cutting edges these forces are relatively low.

From the comparison of FIGS. 2 and 3 it can also be seen that the radial boundary surface 28*a*, which in the initial state (FIG. 2) is spaced below the free ends of the anchoring segments 44, has been drawn in the fitted state (FIG. 3) until it rests on the ends of the anchoring segments which are then pivoted out. Therefore it is not possible for the locking segments 44 to pivot out any further. Thus the anchoring segments 44 are prevented from being pivoted out beyond the position shown in FIG. 3 to such an extent that the truncated cone surfaces 44*b* come to rest on the wall of the fixing bore 46 and then—with further pivoting out—being able to exert radial spreading forces on the wall of the bore.

It can be seen that modifications and variants of the embodiment described can be made within the scope of the idea on which the invention is based. The tightening head 24, which in the described embodiment is a separate component screwed onto the thread 20 of the shank of the anchor element, can also be formed integrally on the shank 14 of the anchor element shank 12. Then the tightening head 24 can only be drawing into the base component 16 by screwing of the nut 36 onto the thread 30 at the upper end of the shank 14. On the other hand, a modification is also conceivable by which a screw head is formed integrally on the upper end of the shank of the anchor element instead of the nut screwed onto the thread 30. Then it is necessary to construct the tightening head 24 as a separately produced component which is screwed onto the thread 20 in order to be able to draw the tightening head 24 into the base component 16.

The invention claimed is:

1. An undercut anchor element comprising:
   an anchor bolt having an elongate cylindrical shank,
   a fixing head or nut screwed onto a threaded portion of a distal end of said anchor bolt,
   a tightening head arranged on a proximal end of said anchor bolt, the tightening head having a conical portion widening toward a proximal free end thereof and terminating at a radially projecting annular projection provided on said free end of the conical portion,
   a tubular base component displaceably mounted about said cylindrical shank, said tubular base component having an internal diameter substantially equal to or greater than an external diameter of said cylindrical shank, said tubular base component having on a distal portion thereof a closed sleeve portion and a circumferential groove formed on an outer face of the tubular base component adjacent a proximal end of the sleeve portion, the sleeve portion having a continuous circumference at least at its proximal end,
   a plurality of longitudinal slots extending proximally from said groove as a starting point and opening at a free proximal end of the tubular base component to form a plurality of anchoring segments each defined between successive slots,
   the end of said anchoring segments being pivotable radially outwards in the distal direction with said groove a pivot point,
   said groove being deformable to allow the anchoring segments to pivot when inserted into a fixing bore by an introduction of a tensional force which displaces the anchor bolt and the tubular base component relative to each other,
   the anchoring segments each having an external shape comprising two truncated cones, each of said cones having a first end of smaller diameter than a second end thereof, the two cones abutting one another at their respective first end faces, each of said anchoring segments comprising a first and second base surface, said first base surface extending from said groove and having a diameter which substantially corresponds to or is smaller than an external diameter of the tubular base component, when said anchoring segments are in a non-deployed position, said second base surface extending radially outward from a proximal end of the first base surface, a free end of said second base surface forming a cutting edge,
   said first base surface being longer than said second base surface, said first and second base surfaces abutting each other to form an angle in a range of 85° to 95°, said first truncated cone, defined by the first base surface, forming an acute angle of less than 30° as bisected by the longitudinal axis of the anchor bolt and said second truncated cone, defined by the second base surface, forming an obtuse angle of greater than 150°,
   the annular projection having an upper boundary surface facing the tubular base component which abuts the free ends of the anchoring segments when said undercut anchor element is in a fully deployed position so as to limit a radially outward spreading of said second base surface against an inside surface of the fixing bore during deployment.

2. Undercut anchor element as claimed in claim 1, wherein the slots which form the anchoring segments in the base component extend from the end of the base component which is at the front in the fitting direction to a groove side wall delimiting the circumferential groove at the rear in the fitting direction.

3. Undercut anchor element as claimed in claim 1, wherein the acute angle is less than 20°.

4. Undercut anchor element as claimed in claim 1, wherein the obtuse angle is more than 160°.

5. Undercut anchor element as claimed in claim 1, wherein the angle in the range between 85° and 95° is substantially at a right angle.

\* \* \* \* \*

UNITED STATES PATENT AND TRADEMARK OFFICE
CERTIFICATE OF CORRECTION

PATENT NO.        : 7,150,595 B2                                              Page 1 of 1
APPLICATION NO.   : 10/333527
DATED             : December 19, 2006
INVENTOR(S)       : Liebig et al.

It is certified that error appears in the above-identified patent and that said Letters Patent is hereby corrected as shown below:

Column 2, Line 37, "in that that the slots" should read -- in that the slots --

Signed and Sealed this

Twenty-fourth Day of April, 2007

JON W. DUDAS
*Director of the United States Patent and Trademark Office*